(12) United States Patent
Poisner

(10) Patent No.: US 7,903,502 B2
(45) Date of Patent: *Mar. 8, 2011

(54) AUTOMATIC READ OF CURRENT TIME WHEN EXITING LOW-POWER STATE UTILITY

(75) Inventor: David I. Poisner, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 1169 days.

This patent is subject to a terminal disclaimer.

(21) Appl. No.: 10/830,201

(22) Filed: Apr. 21, 2004

(65) Prior Publication Data

US 2004/0199801 A1 Oct. 7, 2004

Related U.S. Application Data

(63) Continuation of application No. 10/037,184, filed on Jan. 2, 2002, now Pat. No. 7,400,554.

(51) Int. Cl.
*G04F 8/00* (2006.01)
(52) U.S. Cl. ........................................ 368/113
(58) Field of Classification Search ............ 368/10, 368/110–113; 395/500, 750; 713/300, 340, 713/320, 323, 321, 322, 324; 365/227, 226; 340/636.15, 636.2; 710/260
See application file for complete search history.

(56) References Cited

U.S. PATENT DOCUMENTS

| | | | | |
|---|---|---|---|---|
| 5,691,948 A * | 11/1997 | Sakabe | | 365/227 |
| 5,714,870 A * | 2/1998 | Dunstan | | 713/321 |
| 6,343,363 B1 * | 1/2002 | Maher et al. | | 713/324 |
| 6,763,471 B1 * | 7/2004 | Aoyama | | 713/320 |
| 2002/0095494 A1 * | 7/2002 | Fujita et al. | | 709/224 |
| 2003/0105983 A1 * | 6/2003 | Brakmo et al. | | 713/320 |

OTHER PUBLICATIONS

U.S. Appl. No. 10/037,184 Office Action Mailed Nov. 4, 2004.
U.S. Appl. No. 10/037,184 Final Office Action Mailed May 31, 2005.
U.S. Appl. No. 10/037,184 Office Action Mailed Nov. 16, 2005.
U.S. Appl. No. 10/037,184 Final Office Action Mailed May 17, 2006.
U.S. Appl. No. 10/037,184 Office Action Mailed Feb. 28, 2007.
U.S. Appl. No. 10/037,184 Office Action Mailed Sep. 6, 2007.

* cited by examiner

*Primary Examiner* — Edwin A. Leon
(74) *Attorney, Agent, or Firm* — Matthew C. Fagan

(57) ABSTRACT

A method and apparatus is described for computing a duration of a reduced power consumption state. A time of exiting from the reduced power consumption state is read prior to an execution of an interrupt routine. The read time of exiting is then stored in a register and a calculation of a reduced power consumption state duration may be performed.

25 Claims, 6 Drawing Sheets

AUTOMATIC READ OF CURRENT TIME WHEN EXITING LOW-POWER STATE UTILITY

This application is a continuation of application Ser. No. 10/037,184, entitled "AUTOMATIC READ OF CURRENT TIME WHEN EXITING LOW-POWER STATE," filed Jan. 2, 2002 now U.S. Pat. No. 7,400,554 and assigned to the corporate assignee of the present invention.

FIELD OF THE INVENTION

This invention relates to the field of power management of a computer system processor; more particularly, to the computation of a duration of a reduced power consumption state.

BACKGROUND

Most of the computer systems have power management tools incorporated within, that allow the system's processor to conserve power by entering power safe modes. Due to a variety of power safe modes it is essential that an operating system be able to intelligently determine which power safe mode to enter at a particular time. Some operating systems, especially those that support Advanced Configuration and Power Interface (ACPI), details of which may be found in Advanced Configuration and Power Interface Specification, Rev. 2.0 (Jul. 27, 2000), attempt to measure the duration of time that the Central Processing Unit (CPU) has been placed in power states, such as C1, C2, C3, etc. Depending on the duration of the low-power state the operating system may make an intelligent selection of a low-power state in the future. For example, if the CPU enters a C3 state and remains in the state only for a short time, the operating system may in the future decide to enter C2 state rather than C3 state. On the other hand, if the CPU enters C2 power state for a long time, the operating system may select a C3 state next time it needs to enter a low-power state.

In order to calculate the duration of a particular power state, the operating system needs to determine the time at which the CPU entered the low-power state and the time at which the CPU resumed execution of instructions.

For power states, such as C2 and C3, the processor initiates the transition to the state by accessing a register in a chipset, which halts the processor. Upon exiting the low-power state, the CPU starts the execution at an instruction next to the one that it completed executing prior to entering the low-power state. Thus, the operating system, is able to determine the entering and exiting time of the power state prior to resuming the execution of instructions.

However, the C1 power state is entered by the CPU executing a halt instruction, not by accessing a register. Exit from the C1 low-power state is interrupt driven and the CPU jumps directly to an interrupt service routine, which may be message based, pin based or any other type of interrupt routines. Thus, in a case of the C1 power state the operating system cannot directly measure the duration of time that the CPU was in the C1 power state because the first instruction that is executed does not result in the exit time being stored. The operating system can estimate the duration of the C1 power state, and in a case of an inaccurate estimation the selection of the next low-power state will reflect the inaccuracy.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

In the following description, numerous specific details are set forth in order to provide a thorough understanding of the present invention. It will be apparent, however, to one skilled in the art that these specific details need not be employed to practice the present invention. In other instances, well known materials or methods have not been described in detail in order to avoid unnecessarily obscuring of the present invention.

A method and apparatus for computing a duration of a power management state of a computer processor is described. In one embodiment, a method is described for computing a C1 power state duration by recording the time of the processor's entrance into the C1 power state and the time of the processor's exit from the C1 power state.

Power-Management Technology

As indicated above, a method and apparatus for computing a duration of a power management state of a computer processor is described. Accordingly, some introduction to processor's power management technology is helpful in understanding the teachings described herein.

Embodiments described herein may utilize operating systems that support Advanced Configuration and Power Interface (ACPI). ACPI is a power management specification that allows hardware status information to be available to an operating system. ACPI allows a Personal Computer (PC) to turn its peripherals on and off for improved power management. In addition, ACPI allows the PC to be turned on and off by external devices, such as a mouse or a keyboard.

ACPI supports several processor power states, including a C1 power state. When in C1 power state the processor consumes less power and dissipates less heat than in an active power state where the CPU executes instructions. The C1 power state is supported through active instructions of the processor, without requirement of additional hardware support, and it allows the processor to maintain the context of the system caches. The C1 state is exited when an interrupt is presented to the processor.

Methodology

Figure 1:
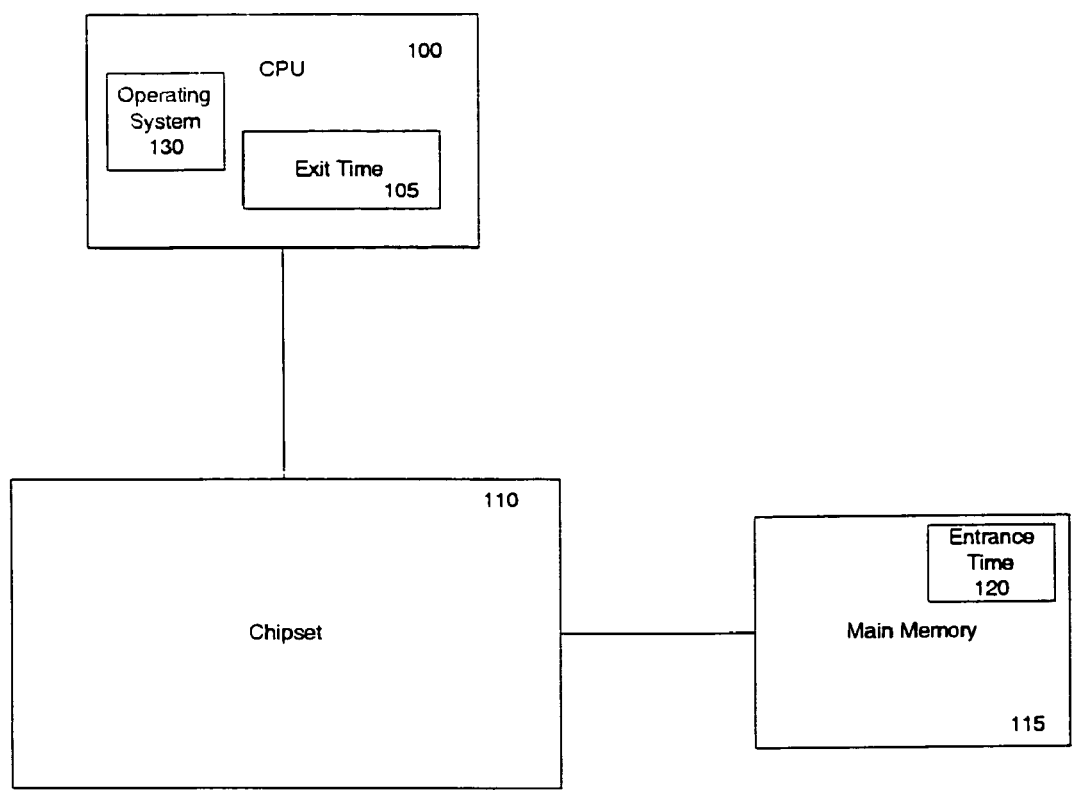
FIG. 1 illustrates one embodiment of a computer system with an exit time register being located in a CPU.
Figure 2A:
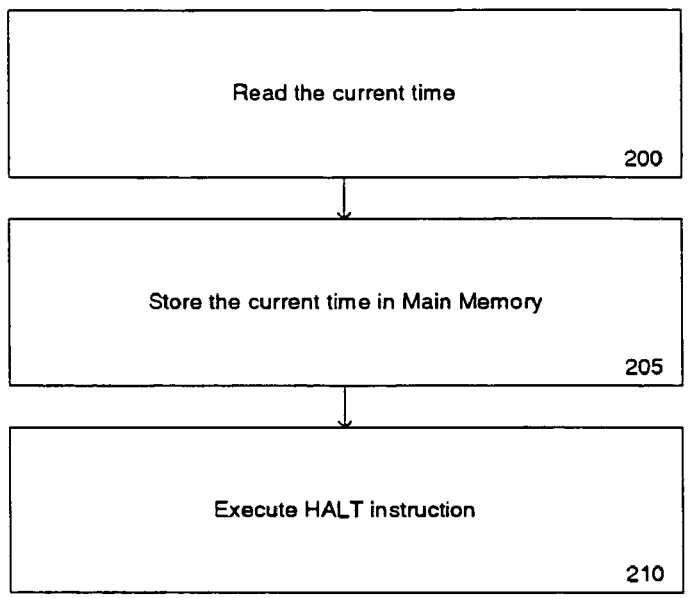
FIG. 2A is a flow diagram illustrating one embodiment of a process for storing current time prior to entering a power state.

With these concepts in mind exemplary embodiments may be further explored. FIG. 1 illustrates one embodiment of a computer system. Prior to a CPU 100 entering the C1 power state, the operating system 130 reads the current time at 200 of FIG. 2A and stores the current time in an entrance time register 120 located in a main memory 115. In one embodiment the operating system 130 reads the current time maintained by a hardware timer, for example an 8254 timer. Upon storing the current time in the entrance time register 120, the operating system 130 executes a HALT instruction. The HALT instruction is an instruction, execution of which, causes the processor to stop executing instructions. In one embodiment the entrance into the C1 power state may be performed by setting a control bit in the processor instead of the execution of the HALT instruction. It will be appreciated that there may be other methods of entering into the C1 power state.

Figure 2B:
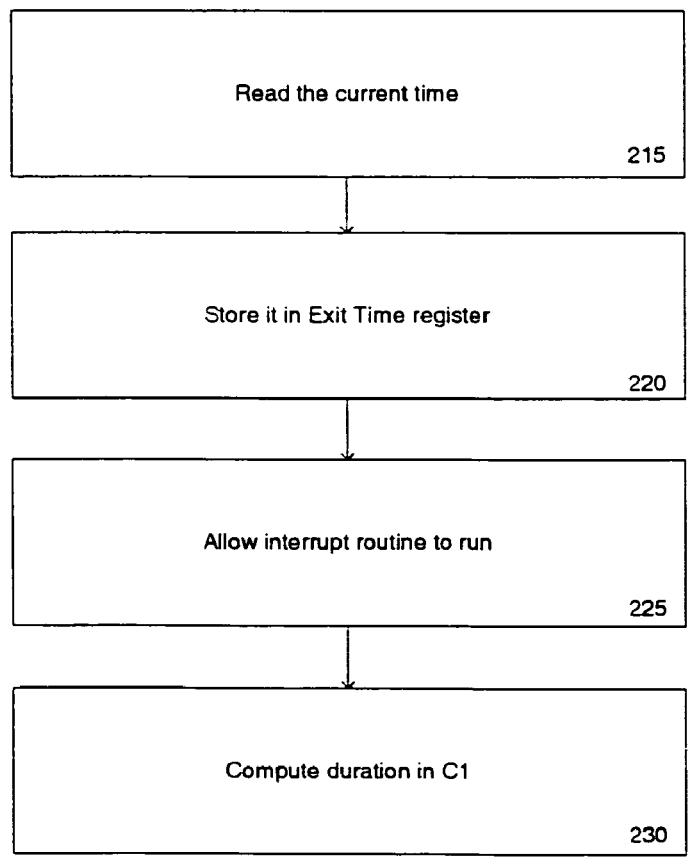
FIG. 2B is a flow diagram illustrating one embodiment of a process for storing current time upon exiting the power state.

In one embodiment, upon an interrupt being presented to the processor and prior to the processor exiting the C1 power state, the operating system 130 at 215 of FIG. 2 reads the current time and at 220 stores the current time in an exit time register 105 of FIG. 1. It will be appreciated that the invention is not limited to storing the current time on the processor and may be stored anywhere, for example in main memory. Upon storing the current time in the exit time register 105, the operating system 130 at 225 allows an interrupt routine to execute. At 230 of FIG. 2 when the interrupt routine completes its execution, the operating system 130 computes the duration of the C1 power state. In one embodiment, the operating system 130 reads the values of the exit time register 105 and the entrance time register 120 and computes the time difference in order to obtain the C1 power state duration.

Figure 3:
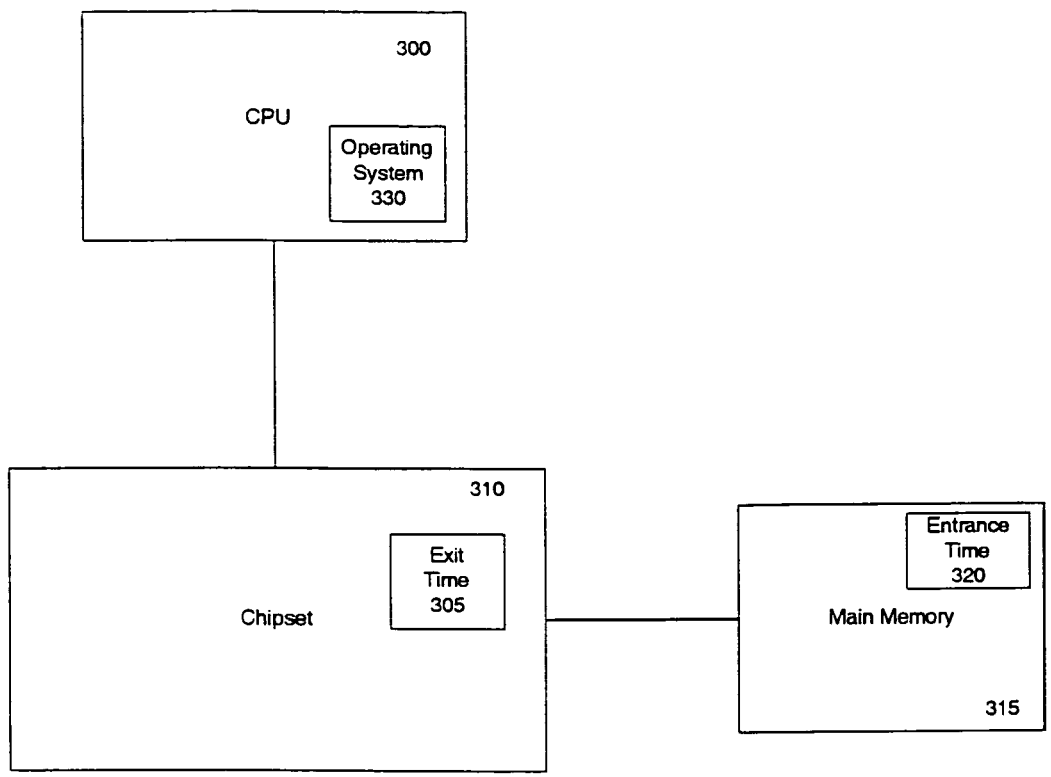
FIG. 3 illustrates one embodiment of a computer system with exit time register located in a chipset.

In one embodiment, prior to the execution of the interrupt routine, the operating system 330 sends the exit time to a chipset 310 of FIG. 3 for storage thereon. This may involve performing a cycle to the chipset 310 and requesting storage of the current time in the exit time register 305. It will be appreciated that the storing of the current time may be performed by utilizing latches, flip-flops or other elements and techniques well known in the art. In addition, it will be appreciated that the cycle performed by the operating system 330 is not limited to any particular cycle and maybe be an I/O cycle, memory cycle, or any other cycle type. Moreover, any type of a chip may be utilized to store the exit time.

Figure 4:
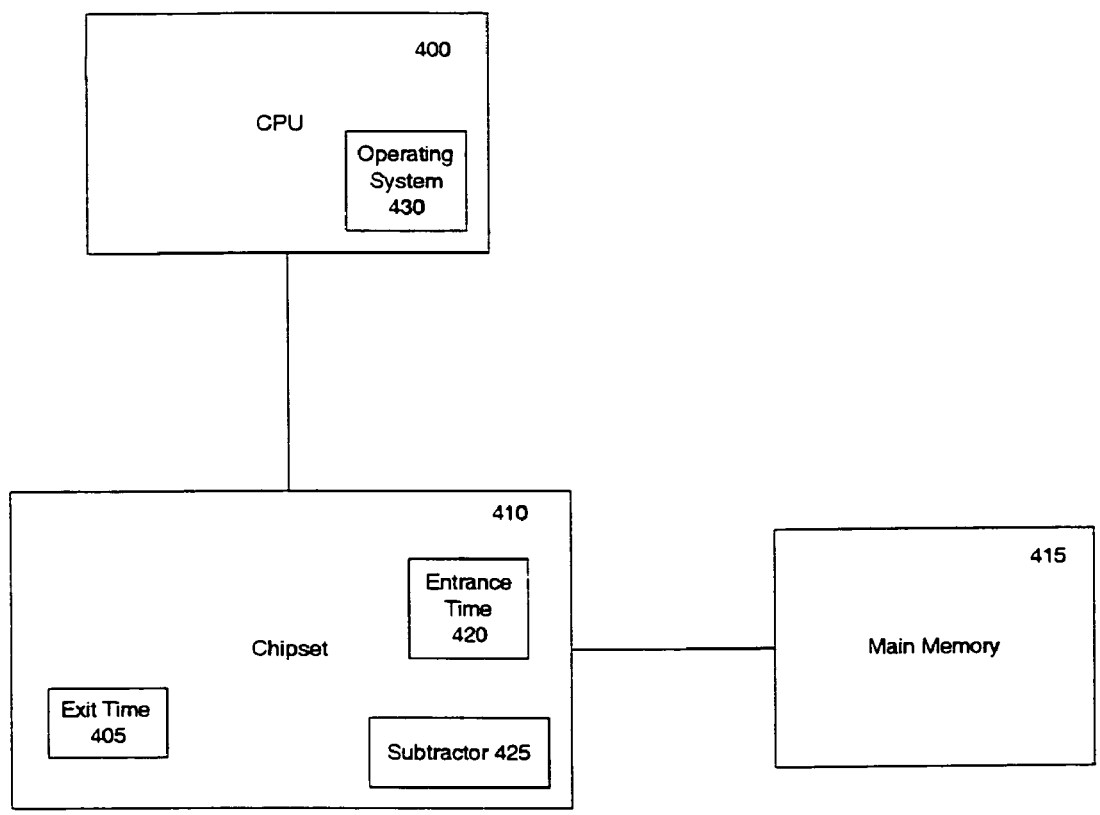
FIG. 4 illustrates one embodiment of a computer system with an entrance time register and the exit time register located in a chipset.

FIG. 4 illustrates an alternate embodiment of a computer system in which, prior to the execution of the HALT instruction, the operating system 430 requests the chipset 410 to store the current time in the entrance time register 420. When an interrupt is presented to the processor, the operating system 430 requests the chipset 410 to store the current time in the exit time register 405. Upon receiving the second request, a subtractor 425 located in the chipset 410 automatically performs a subtraction of values of the exit time register 405 and entrance time register 420 to determine the C1 power state duration.

Figure 5A:
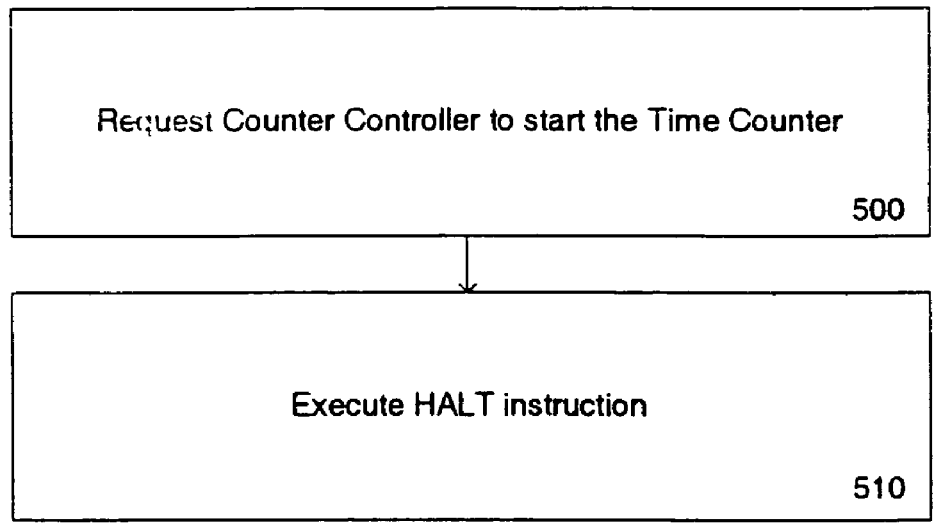
FIG. 5A is a flow diagram illustrating one embodiment of a process for requesting a counter controller to start a time counter.
Figure 5B:
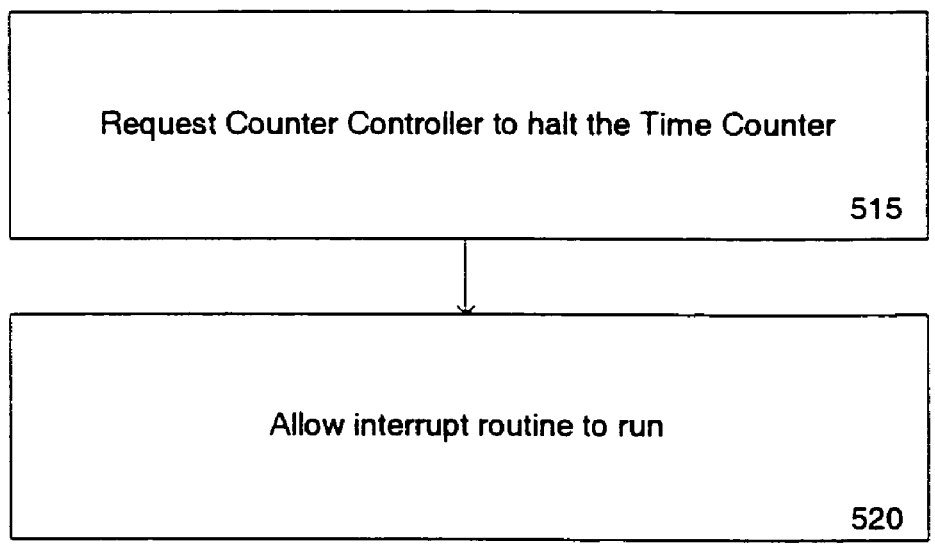
FIG. 5B is a flow diagram illustrating one embodiment of a process for requesting the counter controller to halt the time counter.
Figure 6:
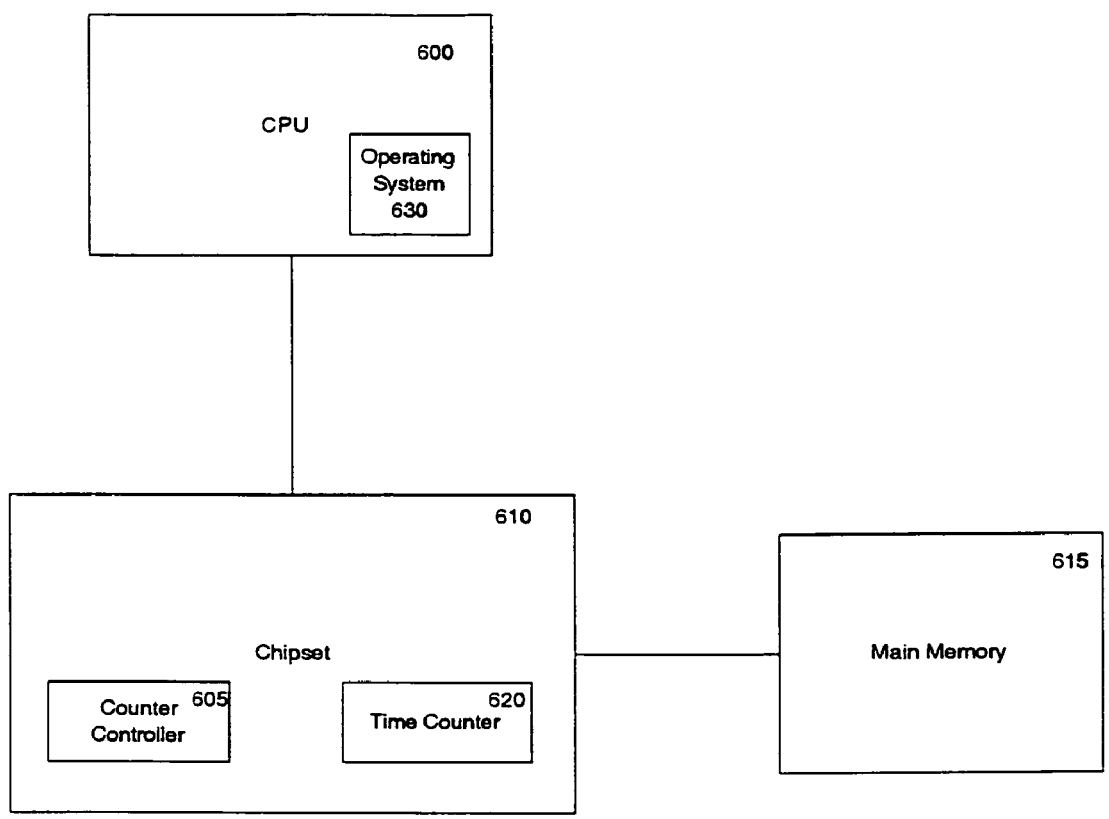
FIG. 6 illustrates one embodiment of a computer system with a time counter located in the chipset.

According to another embodiment of a computer system, at 500 of FIG. 5A the operating system 630 of FIG. 6 requests a counter controller 605 located in the chipset 610 to start a time counter 620 prior to executing the HALT instruction. At 510 the operating system 630 executes the HALT instruction. When the interrupt is presented to the processor, the operating system 630 at 515 requests the counter controller 605 to halt the time counter 620. In this embodiment the C1 power state duration may be obtained by reading the contents of the time counter 620.

It will be appreciated that the above-described system and method may be utilized in a multiprocessor systems. In addition, it will be noted that the terms 'CPU' and 'processor' are used interchangeably in the above description of the invention.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A non-transitory, computer-readable medium having operating system software stored thereon, the operating system software, when executed by a processor, to:

identify an entry of the processor into a C power state in accordance with Advanced Configuration and Power Interface (ACPI) Specification, Revision 2;

identify a time corresponding to the entry of the processor into the C power state;

read a time corresponding to an exit of the processor from the C power state, wherein the processor is to exit from the C power state in response to an interrupt and wherein the time corresponding to the exit is to be identified prior to execution of an interrupt routine by the processor in response to the interrupt; and determine a duration corresponding to the C power state based on the time corresponding to the entry and the time corresponding to the exit.

2. The computer-readable medium of claim 1, wherein the C power state is a C1 power state.

3. The computer-readable medium of claim 1, wherein the C power state is to be entered in response to a halt instruction.

4. The computer-readable medium of claim 1, the operating system software, when executed by the processor, to cause the time corresponding to the exit to be identified prior to execution of the interrupt routine.

5. The computer-readable medium of claim 1, the operating system software, when executed by the processor, to store the time corresponding to the entry in a main memory.

6. The computer-readable medium of claim 1, the operating system software, when executed by the processor, to store the time corresponding to the entry in the processor.

7. The computer-readable medium of claim 1, the operating system software, when executed by the processor, to store the time corresponding to the entry in a chip.

8. The computer-readable medium of claim 1, the operating system software, when executed by the processor, to store the time corresponding to the entry in a chipset.

9. The computer-readable medium of claim 1, the operating system software, when executed by the processor, to store the time corresponding to the exit in a main memory.

10. The computer-readable medium of claim 1, the operating system software, when executed by the processor, to store the time corresponding to the exit in the processor.

11. The computer-readable medium of claim 1, the operating system software, when executed by the processor, to store the time corresponding to the exit in a chip.

12. The computer-readable medium of claim 1, the operating system software, when executed by the processor, to store the time corresponding to the exit in a chipset.

13. The computer-readable medium of claim 1, the operating system software, when executed by the processor, to cause a counter to be started to identify the time corresponding to the entry.

14. The computer-readable medium of claim 1, the operating system software, when executed by the processor, to read a counter to read the time corresponding to the exit.

15. The computer-readable medium of claim 1, the operating system software, when executed by the processor, to read a counter in a chip to read the time corresponding to the exit.

16. The computer-readable medium of claim 1, the operating system software, when executed by the processor, to read a counter in a chipset to read the time corresponding to the exit.

17. The computer-readable medium of claim 1, the operating system software, when executed by the processor, to cause a counter to be halted to identify the time corresponding to the exit.

18. The computer-readable medium of claim 1, the operating system software, when executed by the processor, to select a C power state for the processor based on the determined duration and to cause the processor to enter the selected C power state.

19. A non-transitory, computer-readable medium having operating system software stored thereon, the operating system software, when executed by a processor, to:

identify an entry of the processor into a C power state in accordance with Advanced Configuration and Power Interface (ACPI) Specification, Revision 2;

cause a counter to be started;

identify an exit of the processor from the C power state in response to an interrupt;

cause the counter to be halted; and determine a duration corresponding to the C power state based on a content of the counter.

20. The computer-readable medium of claim 19, wherein the C power state is a C1 power state.

21. The computer-readable medium of claim 19, wherein the C power state is to be entered in response to a halt instruction.

22. The computer-readable medium of claim 19, the operating system software, when executed by the processor, to cause the counter to be halted prior to execution of an interrupt routine by the processor in response to the interrupt.

23. The computer-readable medium of claim 19, wherein the counter is in a chip.

24. The computer-readable medium of claim 19, wherein the counter is in a chipset.

25. The computer-readable medium of claim 19, the operating system software, when executed by the processor, to select a C power state for the processor based on the determined duration and to cause the processor to enter the selected C power state.

* * * * *